United States Patent [19]

Brock

[11] Patent Number: 5,071,241

[45] Date of Patent: Dec. 10, 1991

[54] CAMERA ATTACHMENT SYSTEM AND ILLUMINATING SYSTEM FOR A MICROSCOPE

[76] Inventor: Dennis Brock, 1950 Geronimo Trail, Maitland, Fla. 32751

[21] Appl. No.: 504,163

[22] Filed: Apr. 3, 1990

Related U.S. Application Data

[63] Continuation-in-part of Ser. No. 333,499, Apr. 5, 1989, abandoned.

[51] Int. Cl.[5] ............................................. G02B 21/06
[52] U.S. Cl. ..................................... 359/390; 359/385
[58] Field of Search ............................ 350/523–528, 350/141, 96.10, 96.15, 96.20, 96.27, 96.34; 362/32–34

[56] References Cited

U.S. PATENT DOCUMENTS

| | | | |
|---|---|---|---|
| 3,669,524 | 6/1972 | Shio | 350/523 |
| 4,017,150 | 4/1977 | Imai | 350/96.18 |
| 4,411,490 | 10/1983 | Daniel | 350/96.10 |
| 4,505,555 | 3/1985 | Piller et al. | 350/527 |
| 4,580,195 | 4/1986 | Mori | 362/32 |
| 4,725,727 | 2/1988 | Harder et al. | 250/227.28 |
| 4,744,619 | 5/1988 | Cameron | 350/96.17 |
| 4,796,985 | 1/1989 | Onanian | 350/523 |

Primary Examiner—Bruce Y. Arnold
Assistant Examiner—Thong Nguyen
Attorney, Agent, or Firm—Caesaer, Rivise, Bernstein, Cohen & Pokotilow, Ltd.

[57] ABSTRACT

An attachment system for attaching a camera to a microscope has a mounting structure for securing a camera above the eyepiece of the optical tube of the microscope, and an adaptor for providing a light shield extends between the lens opening of the camera and the optical tube. A downstream end of the adaptor closely surrounds the outer periphery of the optical tube to prevent the undesired ingress of ambient light into the adaptor, while permitting relative movement between the adaptor and the optical tube. An illuminating system for a microscope employs a curved, transparent, light transmissive rod having a light-receiving end surface, a light-receiving peripheral side surface and a light emitting end surface. The rod is mounted with its light emitting end surface aligned with a passage extending through the stage of the microscope upon which a specimen to be viewed and/or to be photographed is retained.

19 Claims, 3 Drawing Sheets

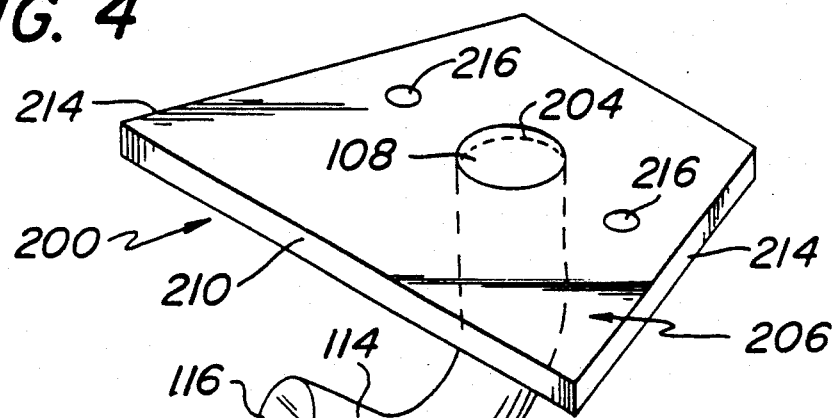
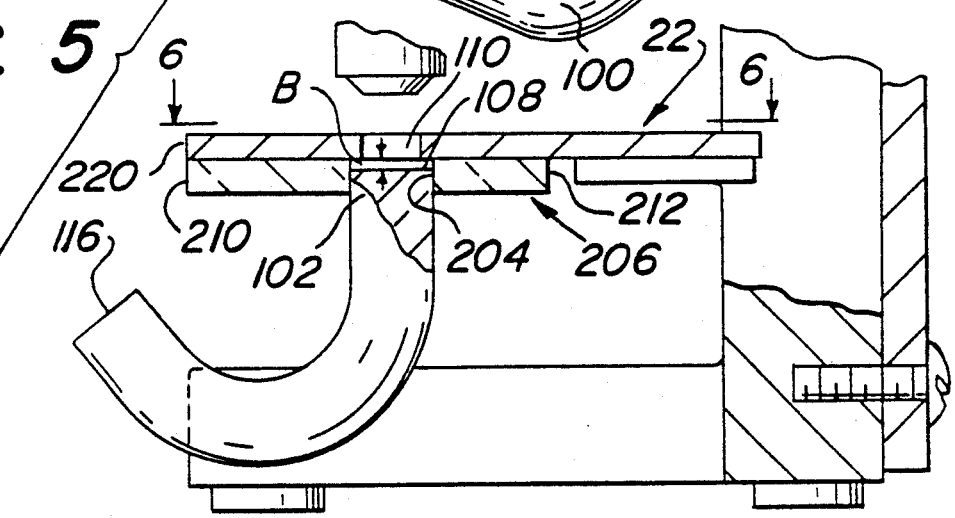
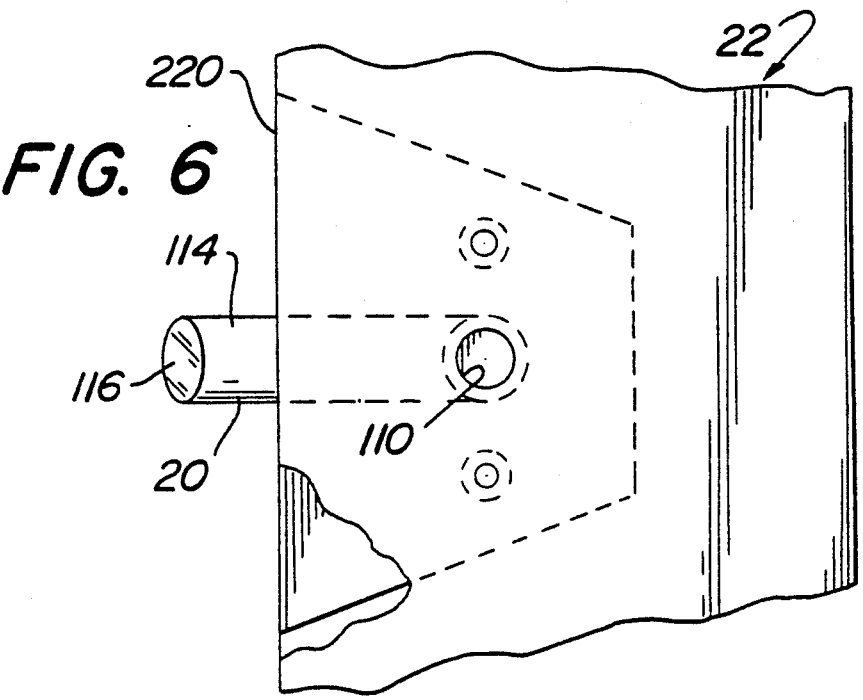

CAMERA ATTACHMENT SYSTEM AND ILLUMINATING SYSTEM FOR A MICROSCOPE

RELATED APPLICATION

This application is application Ser. No. 333,499, filed Apr. 5, 1989, and entitled "Camera Attachment System and Illuminating System for Microscope", now abandoned.

FIELD OF THE INVENTION

This invention relates generally to microscopes, and more specifically to a camera attachment system and an illuminating system for microscopes.

BACKGROUND ART

It is known in the prior art to provide attachment systems for permitting the taking of photographs through a microscope. Representative systems are disclosed in U.S. Pat. Nos. 2,845,842, issued to Leitz et al., and 2,004,807, issued to Fassin.

In the Leitz et al. system the camera is secured to the upstanding neck of a microscope housing through a light-proof extension that is rotatably inserted in the upstanding neck. In the described embodiment the camera is not secured to the ocular unit of the microscope, and the housing and the camera are not adjustable relative to each other.

In the Fassin device a camera and microscope eyepiece are physically attached together as a single unit, to permit either element to be connected to a microscope tube through a solid connector. This connection does not permit relative linear movement between the camera and the microscope tube.

Although illuminating systems employing light guides are well known in the prior art, there is a definite need for a simple, economical and easy to use system for illuminating a specimen to be viewed under high magnification through a microscope. The systems disclosed in the prior art are believed to suffer from one or more of the following deficiencies:

(1) They employ complex and costly arrangements for collecting radiant energy to be transmitted through the light guide.

(2) They require special light sources for generating radiant energy to be transmitted through the light guide to a viewing area.

(3) They employ costly fiber-optic bundles which are shielded about the periphery to prevent the egress and ingress of light through said periphery.

(4) They do not provide for the collection and transmission of light in a simple, cost effective manner.

U.S. Pat. No. 4,796,985, issued to Onanian, discloses the use of a curved, optical wave guide made of a clear plastic material. The wave guide is specially designed to have an enlarged light-receiving end, to which a collecting lens is secured. The opposite end is bevelled to be snapped-fit directly into a passageway in a specimen-supporting stage of the microscope. The arrangement for securing the wave guide to the specimen-supporting stage does not provide for enhancing the light collecting ability of the wave guide.

U.S. Pat. No. 4,017,150, issued Imai, discloses a wide angle illuminating optical system for use with endoscopes. In this system a light guide, in the form of an optical fiber bundle, is provided with a positive lens system at the exit end thereof for establishing wide angle illumination.

U.S. Pat. No. 4,411,490, issued to Daniel, discloses a solar energy system for transmitting solar energy from a collection site to a desired utilization site. The system employs a light pipe which comprises a bundle of optical fibers, with both ends of the fibers being cut and polished to form flat, optically transmissive surfaces. In the embodiments illustrated in FIGS. 15-17, light is transmitted along the length of the bundle from one end surface to the other, to power lighting elements.

U.S. Pat. No. 4,505,555, issued to Piller et al., discloses an illuminating device for microscopes, wherein light is transmitted from a light source adjacent one end of a fiber cable, through the cable, to a mirror (or lens system) for illuminating a specimen on the microscope stand. This system relies upon the use of a separate light source for generating the light which is directed through the fiber cable.

U.S. Pat. No. 4,580,195, issued to Mori, discloses a system wherein light is focused into a receiving edge surface of a conductor rod, and a drive system is provided for rotating the rod to disburse the light over a wide range of space.

U.S. Pat. No. 3,669,524, issued to Shio, discloses a relatively complex system including a light source and lens arrangement for focusing the light into one end of a light guide made up of optical glass fibers.

U.S. Pat. No. 4,725,727, issued to Harder et al., discloses a wave guide including a transparent body covered with an opaque material for transmitting light from a special light source (e.g., a laser) through the length of the body to a specimen to be illuminated.

OBJECTS OF THE INVENTION

It is a general object of this invention to provide a simple and reliable camera attachment system for microscopes.

It is a further object of this invention to provide a camera attachment system which provides a simple and economical arrangement for changing the magnification of a specimen at the camera film plane.

It is a further object of this invention to provide a camera attachment system which permits relative movement between an optical tube of a microscope and a camera, to adjust the magnification of the specimen at the camera film plane, while eliminating the leakage of light between the tube and camera.

It is a further object of this invention to provide a camera attachment system which permits a camera to be mounted to optical tubes of different transverse dimensions and/or configurations.

It is a further object of this invention to provide a camera attachment system which permits a camera to be mounted in different positions relative to a microscope.

It is a further object of this invention to provide a camera attachment system for a microscope which provides wide latitude in varying the magnification of the specimen to be photographed.

It is another general object of this invention to provide a simple and reliable illuminating system for microscopes.

It is a further object of this invention to provide an illuminating system for microscopes which relies upon ambient light in a room to effectively illuminate the stage of the microscope.

It is a further objection of this invention to provide an illuminating system for microscopes which does not require precise alignment of any independent light source relative to the microscope.

It is a further object of this invention to provide an illuminating system for microscopes which provides uniform illumination of a specimen to be viewed through a microscope.

SUMMARY OF THE INVENTION

The above and other objects of this invention are provided by an attachment system for attaching a camera to a microscope of the type having a stand, a stage attached to the stand for supporting a specimen to be photographed, an elongate optical tube carried by the stand and movable relative to the stand, said optical tube having an objective lens at a downstream end thereof adjacent the specimen and an eyepiece at an upstream thereof.

The attachment system is characterized by a mounting-means for securing the camera to the stand of the microscope, with the camera upstream of the eyepiece of the optical tube and with the lens opening of the camera in axial alignment with the elongate optical tube. An adapter for providing a light shield between the lens opening of the camera and the optical tube includes an upstream end with means for securing the adapter about the lens opening of the camera to prevent the undesired ingress of ambient light, and a downstream end for closely surrounding the outer periphery of the optical tube to prevent the undesired ingress of ambient light while permitting relative movement between the optical tube and adapter in a direction along the elongate axis of the optical tube.

In a preferred embodiment of the invention the means for closely surrounding the outer periphery of the optical tube includes a peripheral wall defining an opening for surrounding the outer periphery of the optical tube, and adjustment means for adjusting the size of the opening.

In accordance with another feature of this invention an illuminating system is provided for illuminating a specimen supported on the stage of the microscope. The illuminating system includes a curved, transparent, light-transmissive rod having a light-receiving edge surface, a light-receiving peripheral side surface and a light-emitting edge surface. A securement means is provided for securing the rod to the microscope with the light-emitting edge surface aligned with a passage extending through the stage of the microscope on which the specimen to be viewed is supported.

In the preferred embodiment of this invention the light-emitting surface of the rod is a rough, diffusing surface, and most preferably, the light-receiving edge surface and the light-receiving peripheral side surface are smooth, polished surfaces.

In the most preferred embodiment of this invention the securement means includes a transparent plastics member secured adjacent a lower surface of the stage, said plastics member having a passage therethrough in axial alignment with the passage through the stage, and the light-transmissive rod has a section adjacent its light-emitting edge, which is disposed in the passage through the plastics member and is secured there within.

In the most preferred embodiment of this invention the securement means is a transparent plastics member having a forward edge surface of a greater linear dimension than a rearward edge surface. The forward edge surface and the rearward edge surface are interconnected by side edge surfaces, and the axis of the passage through the plastics member is located closer to the rearward edge surface than the forward edge surface, substantially midway between the side edge surfaces. Most preferably the transparent plastics member is trapezoidal in plan view.

In accordance with the most preferred embodiment of this invention the transparent plastics member forming the securement means is mounted to the stage with its forward edge surface generally in the same plane as the forward edge surface of the microscope stage, to thereby enhance the light collecting ability of the illuminating system.

BRIEF DESCRIPTION OF THE DRAWINGS

Other objects and many of the attendant advantages of this invention will be readily appreciated as the same become better understood by reference to the following detailed description with considered in connection with the accompanying drawings wherein:

FIG. 3 is a horizontal sectional view taken along line 3—3 of FIG. 2;

FIG. 4 is an isometric view of a preferred illuminating system in accordance with this invention;

FIG. 5 is a fragmentary side elevational view, partly in section, showing the manner in which the illuminating system of FIG. 4 is connected to a microscope stage; and FIG. 6 is a plan view taken along line 6—6 of FIG. 5;

DESCRIPTION OF THE PREFERRED EMBODIMENTS OF THE INVENTION

Figure 1:
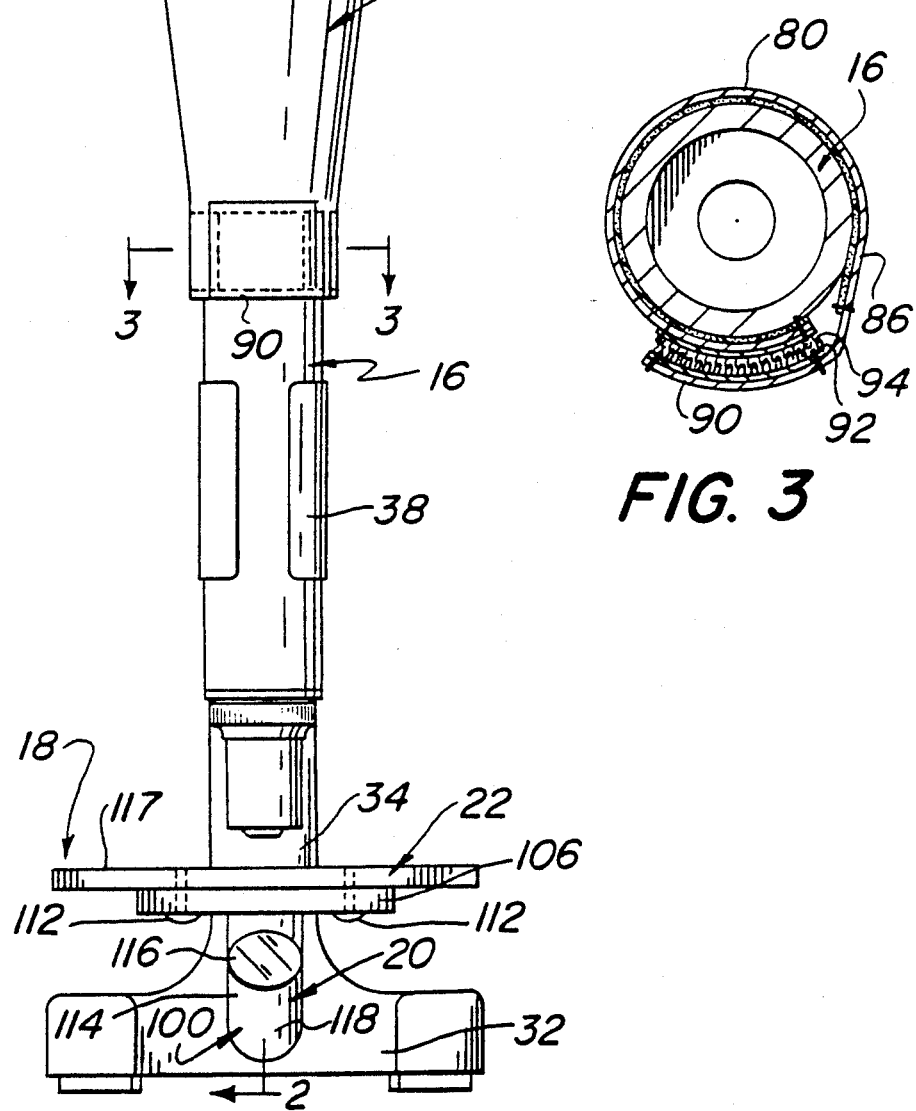
FIG. 1 is a front elevational view of the microscope assembly of this invention.

Referring now in greater detail to the various figures of the drawings wherein like reference characters refer to like parts, a microscope assembly embodying the present inventions is generally shown at 10 in FIG. 1. The assembly 10 basically comprises a light-transmitting adapter 12 positioned between a camera 14 and an optical tube 16 of a microscope 18, and an illuminating system 19 including a generally curved light-transmitting rod 20 for directing light to a stage 22 of the microscope, on which a specimen (not shown) to be viewed is positioned.

Figure 2:
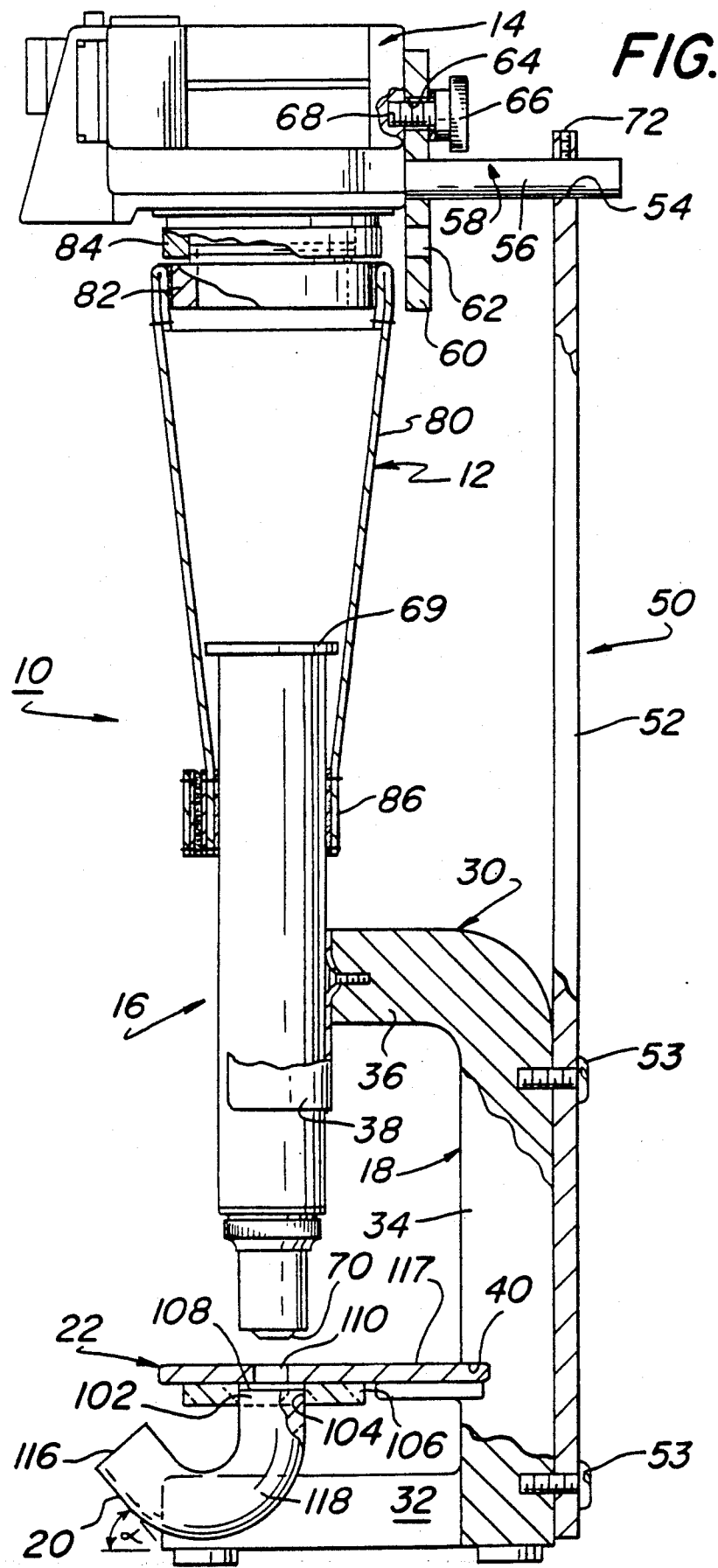
FIG. 2 is a vertical sectional view taken along line 2—2 of FIG. 1.

Referring to FIGS. 1 and 2, the microscope 18 includes a support or stand 30 comprised of a lower, horizontal leg section 32, an upstanding vertical arm 34 and an inturned upper leg section 36. The upper leg section 36 is secured at its free end to a resilient, cylindrical sleeve 38 for slidable supporting the optical tube 16 therein. It should be understood that sufficient frictional engagement is maintained between the engaging surfaces of the resilient sleeve 38 and the optical tube 16 to retain the optical tube in its various adjusted positions. The stage 22 of the microscope is bonded or frictionally secured into a slot or groove 40 provided in the vertical arm 34, to complete the construction of the microscope 18.

The microscope 18 described thus far is a existing piece of equipment which has been invented by applicant, and which is sold under the trademark MAGISCOPE.

Referring specifically to FIG. 2, the microscope assembly 10 includes a unique camera support 50. This support 50 includes a vertically oriented support member 52, which is a generally flat, rectangular member, bolted to a rear or outwardly facing surface of the vertical arm 34 by suitable threaded fastening means 53. A passageway 54 extends through the support member 52 adjacent an upper marginal end thereof and slidably (and preferably also rotatably) receives a cylindrical supporting rod 56 of a camera-attaching bracket assembly 58 therein. This bracket assembly 58 includes a generally flat, rectangular bracket 60 which is welded or otherwise secured to one end of the supporting rod 56. The bracket 60 includes spaced-apart passages 62–64 therein to permit the camera 14 to be attached in different positions relative to the microscope 18. Specifically, a conventional, threaded camera-attaching bolt 66 is inserted through either passage 62, 64, as desired, for threaded attachment within a conventional threaded aperture 68 located in the base of the camera housing.

As is illustrated in FIGS. 1 and 2, the camera 14 is mounted in a horizontal orientation with the lens opening facing downwardly and in axial alignment with the axis of the optical tube 16. In use, the camera lens is omitted, and the lens system is provided by the eyepiece 69 and objective lens 70 associated with the upstream and downstream ends, respectively, of the optical tube 16. It should be noted that both the eyepiece 69 and lens 70 can be removed from the optical tube for replacement with different power eyepieces and lens, respectively.

As can be seen best in FIG. 2, a locking screw 72 extends through a threaded passageway in an upper wall of the vertically oriented support member 52, and intercepts the passage 54 to thereby lock the camera-attaching bracket assembly 58 in its desired orientation relative to the optical tube 16 of the microscope. It should be understood that the threaded passageway also could be provided in a flat side surface of the support member 52, as opposed to the upper surface, since the specific location of the threaded passageway is purely a matter of design choice.

The camera support 50 described above is an extremely simple and reliable system for supporting a camera 14 in a desired orientation and position relative to the optical tube 16 of the microscope 18.

Referring specifically to FIGS. 2 and 3, the unique light-transmitting adapter 12 of this invention is generally in the shape of a truncated cone; including a flexible body portion 80. The body portion can be made of any suitable, flexible material which is opaque to ambient light, and which will permit the desired adjustment thereof about the optical tube 16, as will be described in detail hereinafter. Suitable materials include, but are not limited to, leather, vinyl, or other flexible plastics.

As can be seen best in FIG. 2, the upstream end of adapter 12 includes a threaded member 82 attached by a suitable bonding agent to the upper end of the body portion 80, for use in attaching the adapter to the camera 14 through a conventional adapter 84 secured within the threaded lens opening of the camera.

In accordance with a unique feature of this invention the lower end 86 of the adapter 12 encircles the peripheral wall of the optical tube 16 to permit the optical tube to slide vertically within the adapter. Thus, in accordance with this invention the distance between the image-emitting eyepiece 69 at the upstream end of the optical tube 16 and the film plane in the camera are adjustable relative to each other. This permits a significant magnification change to occur at the film plane.

In all prior art microscope-camera set-ups known to applicant the distance between the image-emitting eyepiece and the camera film plane are fixed, thereby limiting magnification changes to be affected in the optical tube itself (i.e., such as in zoom-type stereo microscope), or by the changing of objective lenses at the downstream end of the optical system. The arrangement for adjusting magnification employed in the present invention is far simpler and less costly than prior art systems; thereby rendering the microscope assembly 10 of this invention well suited for classroom use by young, unsophisticated users.

Referring specifically to FIGS. 2 and 3, a further unique feature of this invention resides in the fact that the passage at the downstream end of the adapted 12, for receiving the optical tube 16 therein, is adjustable, to accommodate optical tubes of different sizes and/or configurations, and also to permit the desired frictional engagement between the adapter 12 and optical tube 16 to be maintained for permitting relative movement between the optical tube and adapter, while preventing undesired quantities of ambient light from entering the adapter, and thereby interfering with the photographic process. Specifically, the lower end 86 of the adapter is split at the bottom thereof, and includes an adjustment tab 90 for tightening the lower end 86 about the peripheral wall of the optical tube 16. In the preferred embodiment of the invention the adjustment tab 90 is formed as a unitary part of the body portion 80, and complimentary fasteners 92 and 94 are included on the free end of the tab 90 and the main body portion 80, respectively, to permit the lower end 86 to be maintained in a desired, adjusted position. In a preferred embodiment of the invention the complimentary fasteners 92 and 94 are conventional Velcro fasteners employing the well known hook and loop arrangement.

Another unique feature of this invention resides in illuminating systems for directing light to the specimen to be viewed through the microscope 18. It should be understood that the illuminating systems can be employed either with or without the camera arrangements described above, it being understood that the illuminating systems of this invention permit high quality viewing of specimens at magnifications up to, and possibly exceeding 400X.

Referring to FIGS. 1 and 2, the illuminating system 19 of this invention, which has been improved in a manner to be described hereinafter, includes a rod light-transmitting rod 20 in the form of a clear, curved, acrylic tube 100 attached at one end 102 thereof within a central passage 104 of a clear, flat, acrylic plate 106, by a suitable solvent binder, such as methylene chloride. It should be understood that other binders may be usable in this invention, the important requirement being that the binder be compatible with the materials to be bonded together and be clear to permit light transmissions therethrough.

Edge surface 108 of the tube 100, adjacent the tube end 102, is matted or roughened, to thereby diffuse, i.e., even out, the light projected therethrough. In accordance with one embodiment of this invention the edge surface 108 is lightly sanded to effect the matting thereof.

As can be seen best in FIG. 2, the stage 22 of the microscope, in accordance with this invention, is provided with a central aperture 110 therethrough, and the matted edge surface 108 of the acrylic tube 100 is in axial alignment with said central aperture when said tube is secured to the stage 22. In this latter regard threaded screws 112 extend through openings in the flat acrylic plate 106 and are threadedly received within complimentary threaded passages (not shown) in the stage 22, to thereby mount the optical tube 100 to the microscope. Moreover, due to the fact that the acrylic plate 106 is a clear member it also functions to receive ambient light therethrough and direct at least part of the ambient light into the acrylic tube 100 and out of the matted edge surface 108 thereof.

As can be seen best in FIG. 2, a light-receiving end 114 of the tube 100, opposite the tube end 102, is inclined upwardly at an angle greater than 45°, and preferably approximately 50° from the horizontal plane, as is illustrated by the angle alpha ($\alpha$). Moreover, an edge surface 116 at the light-receiving end 114 is positioned below an upper, specimen-supporting surface 117 of the stage 22, so that the tube 100 will not interfere with, or provide an impediment to, the size of the specimen supported on thee microscope stage.

The edge surface 116 at the light-receiving end 114 is highly polished for receiving ambient light rays therethrough, such as outside light rays or the light rays generally emitted from conventional lighting fixtures (e.g., incandescent, florescent, etc.) employed in classrooms and laboratories. The peripheral side surface 118 of the acrylic tube 100 also is a highly polished surface for receiving ambient light rays therethrough. This arrangement eliminates the need for making the tube 100 adjustable, since it does not need to be manipulated to line up with any external light source.

Once the light rays enter the acrylic tube 100 they are directed axially through the tube and out the matted edge surface 108 thereof to light the stage on which a specimen to be viewed (and/or photographed) is retained. In this regard it should noted that the specimen is retained directly over the central aperture 110 in the stage 22 to receive transmitted light from the tube 100.

It should be understood that the light-transmitting rod 20 functions to transmit ambient light, in a highly concentrated form, through various specimens to be viewed, and provides sufficient light power to permit high magnification (e.g., 400X, and possibly greater) of such specimens for various purposes. In a classroom or laboratory environment the light-transmitting system of this invention permits blood cells to be viewed at 400X magnification. Prior to this invention such high magnifications were achieved only with much more complex and/or expensive systems.

Referring to FIGS. 4-6, the most preferred embodiment of an illuminating system embodying the present invention is generally shown at 200 This system includes the same generally curved, light-transmitting rod 20 (i.e., acrylic tube 100) as in the illuminating system 19. Moreover, the rod 20 of the illuminating system 200 is secured within a passage 204 of a clear, flat acrylic plate 206, in the same manner as the rod 20 is secured within the central passage 104 of the acrylic plate 106 in the illuminating system 19. In addition, the light-receiving end 114 and the edge surface 116 of the tube 100 have the same orientation relative to the stage 22, in both the illuminating systems 19 and 200.

The difference between the illuminating system 19 and the illuminating system 200 resides in the configuration of the clear, flat acrylic plate 206, the relative position of passage 204 in the plate and the orientation of the plate 206 relative to the microscope stage 22. All of these latter features enhance the light collecting ability of the illuminating system 200 relative to the illuminating system 19. As shown in FIGS. 4 and 5, the tube end 102 of the tube 20 is recessed within the passage 204. The preferred distances of the recess B in FIG. 5 is between approximately 0.031 inch and 0.061 inch. This recess distance is important because if the roughened or matted end 108 is too close to the aperture 110, it will be partially in focus at the focusing plane on the stage 22 and this will produce uneven, partially diffused illumination of a specimen on the stage. On the other hand, if the tube 20 is recessed too much, a significant loss of light intensity will result, and illumination of a specimen on the stage will again be affected.

Referring specifically to FIGS. 4-6 the clear, flat, acrylic plate 206 is generally trapezoidal in plan view; including a forward polished edge surface 210, a rearward polished edge surface 212 and elongate polished side edge surfaces 214 interconnecting the forward and rearward edge surfaces. As can be seen best in FIGS. 4 and 6, the forward edge surface has a greater linear dimension than the rearward edge surface. Referring specifically to FIG. 4 it should be noted that the passage 204 extending through the plate 206 is located closer to the rearward edge surface 212 than to the forward edge surface 210. In accordance with a representative embodiment of this invention, the linear dimension between the forward and rearward edge surfaces is 2 inches, and the axis of the passage 204 is located 1.125 inches rearwardly from the forward edge surface 210.

Referring to FIGS. 4 through 6, the acrylic plate 206 includes a pair of mounting openings 216 on opposite sides of the passage 204, to permit the plate 206 to be secured adjacent the underside of stage 22 with threaded screws (not shown), in the same manner as the illuminating system 19. However, in the illuminating system 200 the acrylic plate 106 is dimensioned relative to the microscope stage 22 so that when the plate 206 is secured to the stage 22, with the axis of the passage 204 aligned with the axis of aperture 110 in the stage, the forward polished edge surface 210 of the plate is generally in the same plane as forward edge surface 220 of the stage 22.

The geometric configuration of the acrylic plate 206 and its orientation relative to the stage 22 maximizes the light collecting ability of the illuminating system 200. In particular, by locating the forward polished edge surface 210 of the plate 206 in the plane of the forward edge surface 220 of the stage 22 the plate 206 will receive a higher angle of light from above the stage, as compared to the recessed orientation of the front edge of the plate 106 shown in FIG. 2. The trapezoidal configuration of the plate 206 functions to concentrate ambient light at the acrylic tube 100, predominately by internal reflection from the angled, polished side edges 214.

Due the increased efficiency of the plate 206 as a light source, the illuminating system 200 has essentially two sources of light; the plate 206 and the tube 100. In the event the rod snaps or breaks in shipment, or do to rough handling during use, enough light is transmitted through the plate 206 in the broken end of the rod secured to said plate to provide some illumination, which, in fact, may be suitable for some applications.

The illuminating system 200 is particularly well suited for use as part of a field microscope, for effectively collecting reflected surface light, such as light reflected from water or even regular terrain. Much of this light arrives at the microscope from low angles, for effective reception by the illuminating system 200.

The light-receiving end 114 of the tube 100 is shown in the figures to be formed at an angle which is roughly perpendicular or 90° to the longitudinal axis of the tube 100. While 90° is the preferred angle, it is believed that the optimum angle is between 60° to 90° with respect to the longitudinal axis.

In summary, the light-transmitting system of this invention permits high magnification viewing of objects without employing expensive and dangerous (especially when used by young people) electric incandescent light sources, complex mirror arrangements of the type which need to be adjusted to align precisely with the light source, or expensive, shielded fiber optic systems of the type identified as prior art herein.

The preset invention employs a simple, stationary, clear acrylic tube of a unique construction and arrangement with an acrylic securement plate to transmit light through specimens to be viewed, and does not require precise alignment of the tube with the light generating source (e.g., florescent lights) in the room in which the microscope is being employed. In fact, applicant has discovered that the light power transmitted through the illuminating system of this invention permits high magnification viewing (e.g., 400X) of specimens through the microscope 18 without the need to align or "point" the edge surface 116 directly at the source of ambient light.

Without further elaboration, the foregoing will so fully illustrate my invention, that others may, by applying current or future knowledge, adopt the same for use under various conditions of service.

I claim:

1. An illuminating system for aiding in illuminating a specimen on a microscope, said microscope including a stand, a stage attached to said stand for supporting the specimen, said stage having a passage therethrough through which light can be directed, and an optical tube carried by said stand and movable relative to said stage for adjusting the focus, characterized in that, said illuminating system includes a curved, transparent, light transmissive rod having a light receiving edge surface, a light receiving peripheral side surface and a light emitting edge surface, and securing means for securing the rod to the microscope with the light emitting edge surface aligned with the passage through the stage and the light receiving edge surface in a generally upwardly facing direction, said securing means including a transparent plastics member adapted to be secured adjacent a lower surface of the stage, said plastics member having a passage therethrough which is located to be in axial alignment with the passage through the stage when the plastics member is secured adjacent the lower surface of the stage, said light transmissive rod having a section thereof adjacent the light emitting edge disposed in the passage through the plastics member and being secured within the passage through said plastics member.

2. The illuminating system of claim 1, characterized in that the light transmissive rod is a single plastics rod.

3. The illuminating system of claim 1 characterized in that said light emitting edge surface is a rough, diffusing surface.

4. The illuminating system of claim 3 characterized in that said light receiving edge surface and light receiving peripheral side surface are smooth, polished surfaces.

5. The illuminating system of claim 1 characterized in that said section of said light transmissive rod is secured within the passage through said plastics member by a clear bonding agent for permitting light transmission therethrough.

6. The illuminating system of claim 1 characterized in that the light-receiving edge surface is positioned below an upper, specimen-supporting surface of the stage when the plastics member is secured to said plate.

7. The illuminating system of claim 6 characterized in that said generally upwardly facing direction is greater than 45 degrees from a horizontal plane when the microscope is positioned on a flat, horizontal surface with the plastics member secured to said plate.

8. The illuminating system of claim 1 characterized in that said plastics member has a forward edge surface, a rearward edge surface cn opposed side edge surfaces, said forward and rearward edge surfaces each having linear dimensions terminating at opposed ends thereof, said opposed ends of each of said forward and rearward edge surfaces joining said side edge surfaces, said linear dimension of said forward edge surface being greater than the linear dimension of said rearward edge surface.

9. The illuminating system of claim 8 characterized in that the passage through said plastics member is closer to the rearward edge surface than to the forward edge surface.

10. The illuminating system of claim 9 characterized in that said plastics member is generally trapezoidal in plan view, with said forward and rearward edge surfaces being substantially parallel to each other.

11. The illuminating system of claim 9 further characterized bv securement means for securing the plastics member to the stage with the forward edge surface of said plastics member in substantially the same plane as a forward edge surface of the stage.

12. The illuminating system of claim 11 characterized in that said plastics member is generally trapezoidal in plan view, with said forward and rearward edge surfaces being substantially parallel to each other.

13. The illuminating system of claim 8 characterized in that said plastics member is generally trapezoidal in plan view, with said forward and rearward edge surfaces being substantially parallel to each other.

14. The combination of a microscope and an illuminating system for aiding in illuminating a specimen on said microscope, said microscope including a stand, a stage attached to said stand for supporting the specimen and having a passage therethrough through which light can be directed, and an optical tube carried by said stand and movable relative to said stage for adjusting the focus, said illuminating system including a curved, transparent, light transmissive rod having a light receiving edge surface, a light receiving peripheral side surface and a light emitting edge surface, characterized in that said illuminating system includes securing means for securing the rod to the microscope with the light emitting edge surface aligned with the passage through the stage and the light receiving edge surface in a generally upwardly facing direction, said securing means including a transparent plastics member connected to the stage adjacent a lower surface of said stage, said plastics member having a passage therethrough which is in axial alignment with the passage through the stage, said light transmissive rod having a section thereof adjacent the light emitting edge disposed in the passage through the plastics member and being secured within the passage through said plastics member.

15. The illuminating system of claim 14 characterized in that said plastics member has a forward edge surface, a rearward edge surface and opposed side edge surfaces, said forward and rearward edge surfaces each having linear dimensions terminating at opposed ends thereof, said opposed ends of each of said forward and rearward edge surfaces joining said side edge surfaces, said linear dimension of said forward edge surface being greater than the linear dimension of said rearward edge surface.

16. The combination of claim 15 characterized in that the passage through said plastics member is closer to the rearward edge surface than to the forward edge surface.

17. The combination of claim 15 characterized in that said plastics member is generally trapezoidal in plan view, with said forward and rearward edge surfaces being substantially parallel to each other.

18. The combination of claim 15 further characterized by securement means for securing the plastics member to the stage with the forward edge surface of said plastics member in substantially the same plane as a forward edge surface of the stage.

19. The combination of claim 18 characterized in that said plastics member is generally trapezoidal in plan view, with said forward and rearward edge surfaces being substantially parallel to each other.

* * * * *